March 22, 1955     F. W. BOWER     2,704,673
TOOL CARRIER
Filed Feb. 4, 1952     2 Sheets-Sheet 1
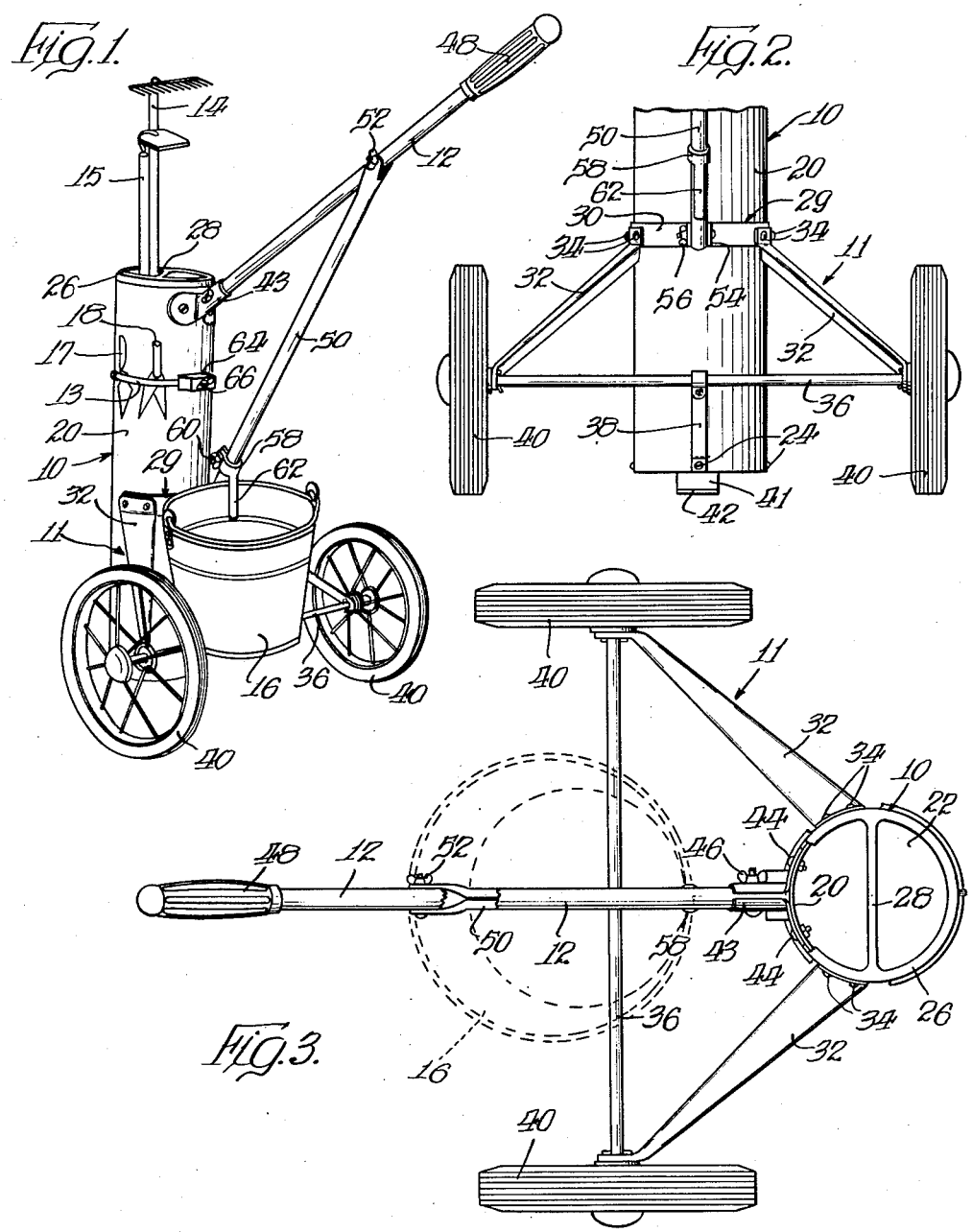
INVENTOR.
Frank W. Bower
BY Brown, Jackson, Boettcher & Dienner
Attys.

March 22, 1955 F. W. BOWER 2,704,673
TOOL CARRIER
Filed Feb. 4, 1952 2 Sheets-Sheet 2
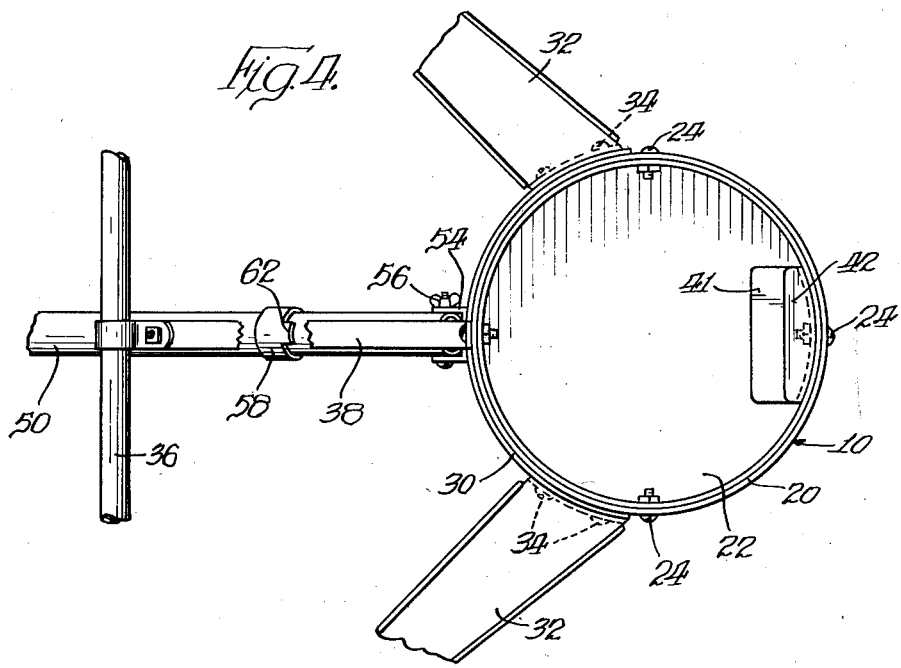
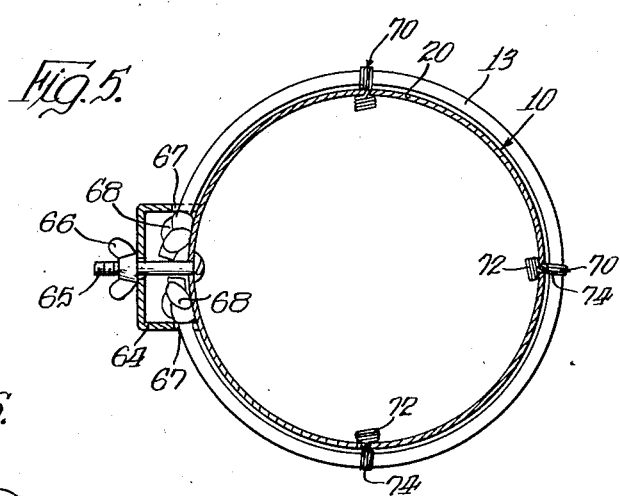
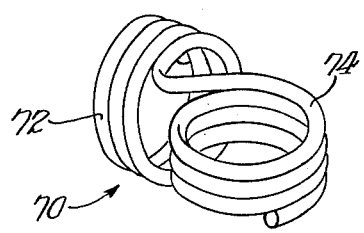
INVENTOR.
Frank W. Bower

United States Patent Office 2,704,673
Patented Mar. 22, 1955

2,704,673
TOOL CARRIER

Frank W. Bower, Goshen, Ind.

Application February 4, 1952, Serial No. 269,811

3 Claims. (Cl. 280—47.19)

The present invention relates to tool and implement carriers and, particularly, to utility carts for use in the performance of various occupations, especially gardening and the like.

Various tool and equipment carriers and carts for transporting tools, implements, athletic equipment and the like are known. Perhaps the best known of these is the so-called caddy cart for golf clubs. It is an object of the present invention to provide an improved cart or carrier of this general character and, particularly, to provide an improved cart or carrier for tools and implements such as those used for gardening.

Another object of the invention is the provision of an improved cart or carrier comprising a utility cart adapted not only for the transportation of tools, implements and the like, but also for the transportation of materials to be used in the particular occupation, such, for example, as fertilizer and water for gardening purposes.

A further object of the invention is to provide an improved utility cart adapted for the reception of various sizes and types of tools and implements wherein the tools and implements will be disposed for ready and convenient access.

In accordance with the present invention, I provide a utility cart comprising an elongate container adapted for the reception of relatively large tools and implements and particularly long-handled implements, such as hoes and rakes, a retainer disposed about the outer wall of the container for the reception of small tools, such as shears, trowels and the like, a wheeled carriage for the container, and means incorporated in the carriage structure adapted for the reception of material containers, such as pails and cans.

With respect to the foregoing, it is an object of the present invention to provide an improved retainer for small tools comprising an expansible band encircling the implement container and adapted yieldably to retain tools between itself and the container so that the tools are always disposed for ready removal from and may readily be inserted in the retainer.

A still further object of the invention is to provide an improved wheeled carriage for utility carts including an axle adapted for the reception of a material container and clamp means for retaining the material container on the axle.

An additional object of the invention is the provision of an improved utility cart of sturdy, yet economical, manufacture and assembly.

Other objects and advantages of the invention will become apparent in the following detailed description of a preferred embodiment of the invention.

Now, in order to acquaint those skilled in the art with my invention, I shall describe, in connection with the accompanying drawings, a preferred embodiment of the invention and one mode of constructing the same.

In the drawings:

Figure 1 is a perspective view of the utility cart of the present invention, showing the manner of use thereof;

Figure 2 is a partial rear elevation of the cart;

Figure 3 is a top plan view of the cart, with portions broken away to reveal the handle structure and mounting;

Figure 4 is a partial bottom plan view of the cart;

Figure 5 is a horizontal cross section of the implement container, taken at the level of the tool retainer; and Figure 6 is a perspective view, on an enlarged scale, of a fastener for supporting the tool retainer on the implement container.

Referring now to the drawings, the utility cart of the present invention is shown as comprising, generally, a container 10, a wheeled carriage 11 including a handle 12, and an expansible retainer band 13 encircling the container 10. As is shown in Figure 1, the container 10 is adapted for the reception of long-handled implements, such as a rake 14 and a hoe 15, the wheeled carriage 11 is adapted for the reception of a pail 16 or the like, and the retainer 13 is adapted for the reception of a plurality of small tools, such as a trowel 17 and a shears 18. The cart, in use, assumes a normal position, as shown in Figure 1, wherein the axis of the container 10 is substantially vertical, in which position the cart is retained upright by resting on the wheels of the carriage 11 and the bottom of the container 10. To propel the cart, the operator need only lower the handle 12 to elevate the bottom of the container so that the cart may be freely pushed or pulled about.

The container 10 preferably comprises a cylindrical or tubular body portion 20 closed at its bottom and open at its top. The body 20 is preferably formed of sheet metal or a similar rigid material and is closed at its bottom by means of an inverted cup-shaped plate 22 suitably secured to the lower end of the tubular body portion 20 by means of fasteners, such as a plurality of bolts 24, extending through the wall of the body 20 and the flange portion of the plate 22. The cylindrical container is open at its upper end, but is preferably provided with a divider 26 comprising an annular ring suitably secured, as by a press fit or welding, to the upper end of the container 10 and including at least one divider bar 28 extending across the opening. The purpose of the divider will be described in greater detail hereinafter.

The wheeled carriage 11 includes a V-shaped bracket, indicated generally at 29, secured at its apex to the container 10. The bracket 29 includes an arcuate band 30 adapted to embrace the peripheral surface of the container to one side thereof and a pair of struts or legs 32 extending angularly outward and downward from the container. The struts 32 and the arcuate band 30 are suitably secured together and secured to the tool holder 10 by means of a plurality of fasteners, such as bolts 34, extending through the various members and the wall of the body portion 20 of the tool holder or container 10. At their outer ends, the struts 32 are each suitably formed for the reception and support of an axle 36. The axle 36 is preferably braced with respect to the container 10 by means of a strut 38 extending between the central portion of the axle 36 and the lower end of the container 10. A pair of wheels 40 are mounted on the opposite ends of the axle 36 and are rotatably supported thereby in a conventional manner. When assembled, the relationship between the struts 32, the axle 36, the brace 38, the tool holder 10 and the wheels 40 is such that the ground engaging or lower portions of the wheels 40 are disposed in substantially the same plane as the bottom or lower end of the container 10 when the container is disposed with its axis substantially vertical. When the container 10 is tilted with respect to the ground, so that the upper end thereof overlies the axle 36, the lower end of the container 10 will be elevated with respect to the ground engaging portion of the wheels 40 so that same may be readily moved from place to place by means of the handle 12. While the bottom of the container may directly engage the ground, it is preferable to provide a toe or rest member 41 suitably secured to the body 20 of the container by means of one of the bolts 24. The toe 41 presents a ground engaging surface 42 upon which the cart may rest when not being propelled, as is clearly shown in Figure 2. It will be apparent that when the container 10 is disposed with its axis substantially vertical, the toe 41 will rest upon the ground to retain the container in an upright position so that tools and implements and the like carried by the utility cart will be disposed for ready access.

Adjacent the upper end thereof, a bracket 43 is suitably secured to the outer surface of the container 10 to the same side of the container as the bracket 29. The bracket 43 may be suitably secured to the container 10 by means of a plurality of fasteners, such as the bolts 44. The bracket 43 presents a tubular socket adapted for the reception of the handle 12, which may be suitably formed of cylindrical or tubular metallic stock. A bolt and wing nut 46 extends transversely across the socket portion of the bracket 43 so that the socket portion of the bracket may be clamped about the lower end of the handle 12 to retain the handle in association with the container 10. If desired, the handle 12 may be provided with suitable apertures in opposite walls thereof adjacent the lower end thereof adapted for the reception and passage of the bolt 46 so that the handle 12 may be suitably secured to bracket 43. At its outer end, the handle 12 may suitably carry a hand grip 48 or the like.

The handle 12 is preferably braced with respect to the remainder of the wheeled carriage 11 by means of a supporting strut 50 extending between the intermediate portions of the handle 12 and the bracket structure 29. Preferably the supporting strut or brace 50 is bifurcated at its upper end to embrace the handle. Suitable apertures are provided in the bifurcations of the brace 50 and suitable apertures are provided in opposite walls of the handle adapted for the reception of a bolt and wing nut 52 extending through the various apertures and by means of which the strut 50 is secured to the handle 12. At its lower end, the supporting strut 50 is suitably secured to the bracket 29 by means of a clevis 54 suitably secured to the arcuate band 30 of the bracket 29. The strut 50 is preferably secured to the clevis 54 by means of a bolt and wing nut 56 extending through suitable apertures provided in the clevis and in opposite walls of the strut at the lower or inner end thereof. The supporting strut 50, like the handle 12, is preferably formed of tubular metallic stock.

From the foregoing, it will be appreciated that the band 30, the struts 32, the axle 36, the brace 38, the wheels 40, the bracket 43, the handle 12 and the brace 50 comprise a wheeled carriage for the container 10. It likewise will be appreciated that the handle bracket means or structure comprises the tubular handle member 12, the bracket 43, and the supporting strut 50.

In addition to being adapted to support and transport the container 10, the wheeled carriage 11 is adapted for the reception and transportation of a material container, such as a pail or the like, by means of which materials to be utilized in the particular occupation to be pursued may be transported with the tools of the occupation. To this end, the axle 36 is disposed to one side and spaced substantially from the body 20 of the container 10 and the V-shaped frame 29 is open at its upper side so that the axle 36 is adapted for the reception of a pail 16 or like container. As utilized hereinafter, the term pail is to be considered as including any suitable type of material container. To retain a pail received on the axle 36 on the axle, a clamp or retaining member 58 is movably mounted on the supporting strut 50 of the handle structure for engagement with the upper portion or lip of the pail. The retaining member 58 preferably comprises a generally C-shaped body portion adapted to be releasably secured at various points along the supporting strut 50 by means of a bolt and wing nut 60. Projecting outwardly from the body portion of the clamp member 58 is a depending retaining finger 62 which extends generally normal to the axis of the axle 36. When a pail is disposed upon the axle 36, the axle will engage and support the bottom of the pail and the top or upper end of the pail will, at one side thereof, engage the inclined supporting strut 50. To retain the pail in this position, the clamp member 58 is adapted to be moved downwardly along the supporting strut 50 so that the finger 62 thereof is disposed within and engages the inner surface of the pail so as to hold same in engagement with the supporting strut 50. Accordingly, it will be appreciated that the pail will be locked to the wheeled carriage of the utility cart. The supporting strut 38 provides substantial support for the axle 36 so that relatively heavy loads may be carried thereon. The center of gravity is low and the weight of the bucket is disposed almost centrally of the axle, but preferably slightly to the side thereof opposite the tool holder 10 to counterbalance the holder. Tilting of the cart will effect little movement of the pail, so that the material in the pail will not be spilled.

The expansible band 13 of the present invention preferably comprises an elastic band encircling the body 20 of the container 10 adjacent the upper end thereof. The band is preferably supported at spaced points about the periphery of the container and is adapted between the supporting points for the reception and retention of small tools. Preferably, the band 13 comprises a length of elastic material adapted to encircle the container 10 and adapted to have its ends suitably secured to the body of the container. Preferably, a bracket 64 is secured to the body of the container by means of bolt 65 extending through the wall of the container and the bracket. The bracket 64 is preferably secured to the container 10 by means of a wing nut 66 threaded upon the bolt 65. The bracket 64 preferably comprises a box-like housing member having arcuate grooves 67 in the free edge of the side walls thereof, the arcuate grooves being adapted for the reception and passage of the elastic band 13. The ends of the elastic band 13 are preferably knotted, as at 68, within the interior of the housing or bracket 68 so that the knots engage the side walls of the housing to retain the elastic band in encircling position on the container 10.

In addition to the bracket 64, the band 13 is preferably supported at spaced points around the periphery of the container 10 by means of a plurality of fasteners 70. As shown in Figure 6, the fasteners 70 preferably comprise an integral piece of wire wound into two coils 72 and 74, with the axes of the coils being disposed at right angles to one another and preferably with a continuation of the axis of one coil, the coil 72, extending substantially diametrically across the other coil, the coil 74. To mount the fasteners 70 to the container 10, the body 20 of the container is provided with small apertures at spaced points about the periphery thereof. One end of a fastener may be spread from its coil and then suitably passed through an aperture and into engagement with the inner wall of the container. From a consideration of Figure 6, it will be apparent that the end of coil 72 should be passed through the aperture. Thereafter, a threading action may be imparted to the fastener to effectively screw the fastener through the aperture in the wall of the container so that same is secured to and supported thereby. To the outer surface of the container 10, each fastener presents a loop, the coil 74, adapted for the passage and support of the elastic band 13, so that the elastic band is supported at spaced points about the periphery of the container.

As previously pointed out, the utility cart of the present invention is particularly adapted for the transportation of tools, implements and materials utilized in gardening. For example, the pail 16 to be supported by the axle 36 and the retaining member 58 may be suitably filled with water, fertilizer or the like. The tool holder 10 comprises an elongate receptacle adapted for the reception of relatively large tools or implements, particularly rakes, hoes and the like. The divider bar 28 of the divider 26 serves to retain the long-handled implements in such position that same do not have excessive freedom of movement in the container 10 when same is tilted for transportation from place to place. Preferably, the bar 28 extends transversely of the handle 12 and the long-handled implements are disposed to the side of the divider bar 28 opposite the handle 12 so that same will not fall toward the user of the utility cart when the container 10 is tilted for transportation.

As will be appreciated, it would be undesirable for a user of a utility cart to throw or drop small tools, such as trowels, shears, pruning knives and the like, into the container and then reach to the bottom of the container to retrieve such tools. Accordingly, the present invention provides the expansible band 13 adapted for the reception of such relatively small tools. In particular, the band 13 is adapted to be stretched away from the peripheral wall of the container 10 so that small tools may be suitably inserted between the band and the peripheral wall of the container to be retained in such position by the elasticity of the band. Accordingly, it will be appreciated that the expansible band 13 provides for the convenient reception and retention of tools and retains the tools in a position for ready access by the user of the utility cart. The handle 12 preferably projects at an inclination upwardly of the container 10 so that same is disposed at a convenient height for grasping by the user. As will be apparent, the rigid structure of the wheeled carriage and the container renders the cart adapted for pushing or pulling, according to the desire of the user.

The various parts of the utility cart of the present invention are preferably detachably secured together, as by means of bolts and nuts as described, so that the cart may be readily disassembled for winter storage and so on. The handle structure, the handle 12 and the strut 50, are preferably secured to the container 10 and wheeled carriage 11 by means of bolts and wing nuts so that same may be readily removed to provide for convenient temporary storage of the cart in a small space.

From the foregoing, it will be appreciated that the present invention provides an improved utility cart of economical construction and assembly adapted for various uses and particularly adapted for utilization in occupations, such as gardening, wherein a plurality of different size and shaped tools and implements must be transported from place to place and wherein materials to be utilized in the occupation are also to be transported from place to place.

While I have described what I regard to be a preferred embodiment of my invention, it will be apparent that various changes, rearrangements and modifications may be made therein without departing from the scope of the invention, as defined by the appended claims.

I claim:

1. In a device of the class described, an axle having ground engaging wheels at its ends, a vertically extending tool holder disposed to one side of said axle, a V-shaped bracket attached at its apex to the side of said holder and having its legs diverging downwardly and connected to said axle, said legs and said axle being so disposed with respect to said tool holder that the bottom of said tool holder and the ground engaging portion of said wheels lie substantially in a common plane when said tool holder is disposed substantially vertical, said bracket leaving room above the central part of said axle and between said divergent legs whereby the bottom of a pail may be rested on said axle, bracket means connected to said tool holder and extending forwardly over said axle in spaced relation thereto, and a dependent retaining finger slidably mounted on said bracket and adapted to engage the lip of a pail when the same is seated on said axle between said legs.

2. In a device of the class described, an axle having ground engaging wheels, a vertically disposed cylindrical tool holder disposed to one side of and extending below said axle, struts extending diagonally downwardly and outwardly from said holder and connected to said axle, said struts and said axle being so disposed with respect to said tool holder that the bottom of said tool holder and the ground engaging portion of said wheels lie substantially in a common plane when said tool holder is disposed substantially vertical, the upper side of said axle being exposed between said struts and adapted for the reception and support of the bottom of a pail, a brace extending from the central portion of said axle downwardly to the lower end of said tool holder, a handle brace extending from said holder diagonally upward above and over said axle, said handle brace having a handle at its outer end, and a downwardy projecting pail retaining member mounted on said handle brace, said pail retaining member being disposed above the axle and being adapted to overhang the lip of a pail seated on the axle.

3. A utility cart comprising an elongate cylindrical container closed at its bottom and open at its top and adapted for the reception of long-handled implements, a V-shaped bracket secured at its apex to said container, said V-shaped bracket including a pair of diverging legs extending to one side of said container, an axle extending transversely of said container and supported in spaced relation to said one side of said container by said legs, a pair of wheels mounted on the opposite ends of said axle, said legs and axle being so disposed with respect to said container that the bottom of said container and the ground engaging portion of said wheels lie substantially in a common plane when said container is disposed with its axis substantially vertical and the bottom of said container is elevated with respect to the ground engaging portion of said wheels when said container is disposed with its axis inclined to said one side thereof, a handle bracket secured to said container adjacent the upper end thereof and including a handle extending to said one side of said container, a supporting strut for said handle, said supporting strut being connected to said handle at its outer end and to said V-shaped bracket at its inner end, a retaining member movable along said supporting strut and including a depending finger extending over said axle in spaced relation thereto, said V-shaped bracket being open whereby said axle is adapted for the reception of a pail, said retaining finger being adapted for engagement with the lip of the pail to retain the same on said axle, and a brace secured to and extending between the bottom of said container and the central portion of said axle.

References Cited in the file of this patent

UNITED STATES PATENTS

| Number | Name | Date |
|---|---|---|
| 431,862 | Abrams | July 8, 1890 |
| 759,495 | Baines | May 10, 1904 |
| 900,014 | Hennerman | Sept. 29, 1908 |
| 1,005,235 | Langguth | Oct. 10, 1911 |
| 1,299,575 | Holmes | Apr. 8, 1919 |
| 1,751,902 | Brown | Mar. 25, 1930 |
| 1,955,650 | Obarski | Apr. 17, 1934 |
| 2,368,752 | Duis | Feb. 6, 1945 |
| 2,399,518 | Strain | Apr. 30, 1946 |
| 2,415,392 | Morehouse | Feb. 4, 1947 |
| 2,520,226 | Smith | Aug. 29, 1950 |
| 2,538,374 | May | Jan. 16, 1951 |
| 2,660,389 | Lion | Nov. 24, 1953 |

FOREIGN PATENTS

| Number | Country | Date |
|---|---|---|
| 584,814 | Great Britain | Jan. 23, 1947 |